Figure 1:
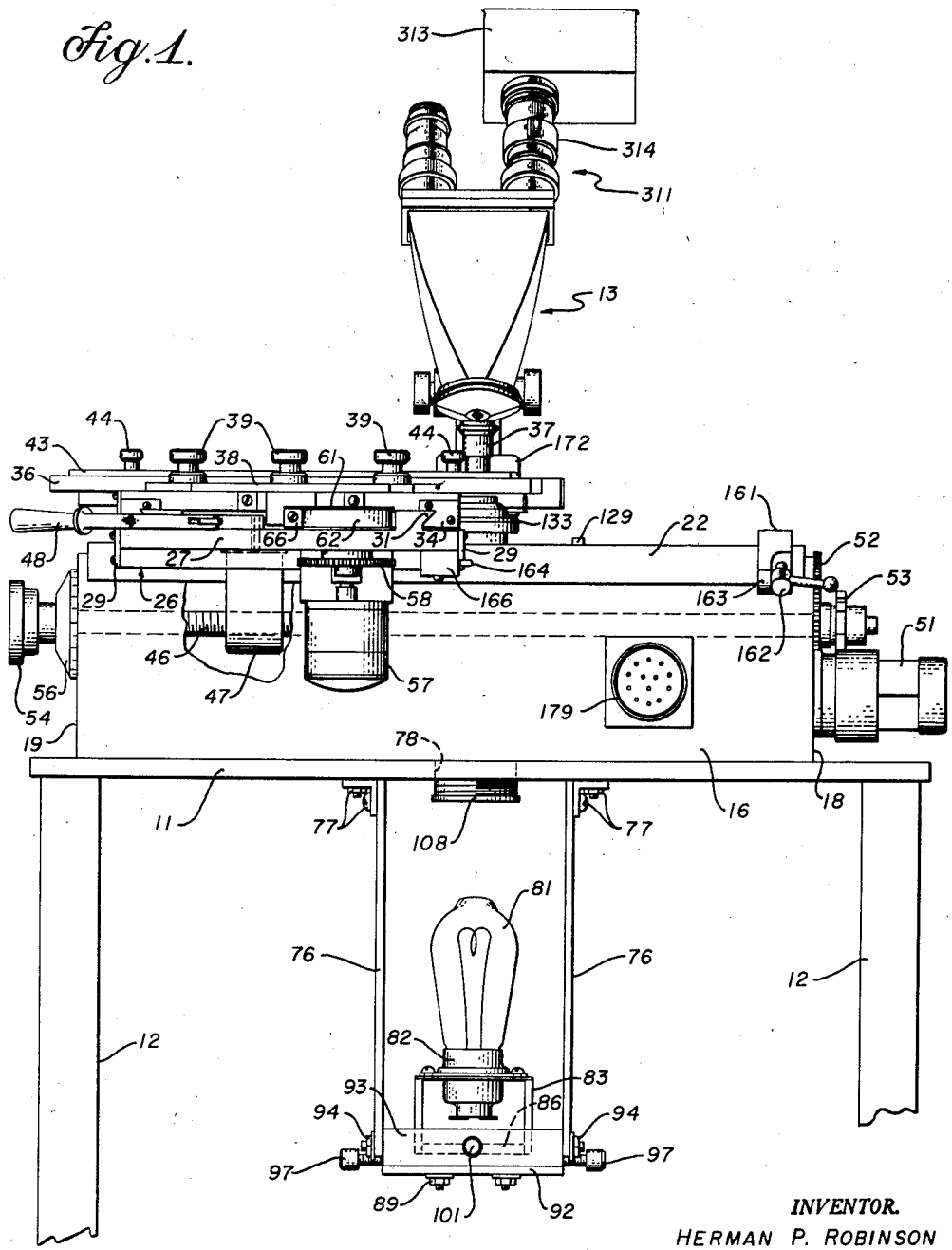

June 7, 1960

H. P. ROBINSON 2,939,633

AUTOMATIC COUNTER

Filed June 18, 1956

9 Sheets-Sheet 1

INVENTOR.
HERMAN P. ROBINSON
BY
*Roland A. Anderson*
ATTORNEY.

June 7, 1960   H. P. ROBINSON   2,939,633
AUTOMATIC COUNTER
Filed June 18, 1956   9 Sheets-Sheet 4

INVENTOR.
HERMAN P. ROBINSON
BY
ATTORNEY.

June 7, 1960

H. P. ROBINSON 2,939,633

AUTOMATIC COUNTER

Filed June 18, 1956

9 Sheets-Sheet 6

ENERGY DISTRIBUTION CURVE

INVENTOR.
HERMAN P. ROBINSON
BY
*Roland A. Anderson*
ATTORNEY.

INVENTOR.
HERMAN P. ROBINSON

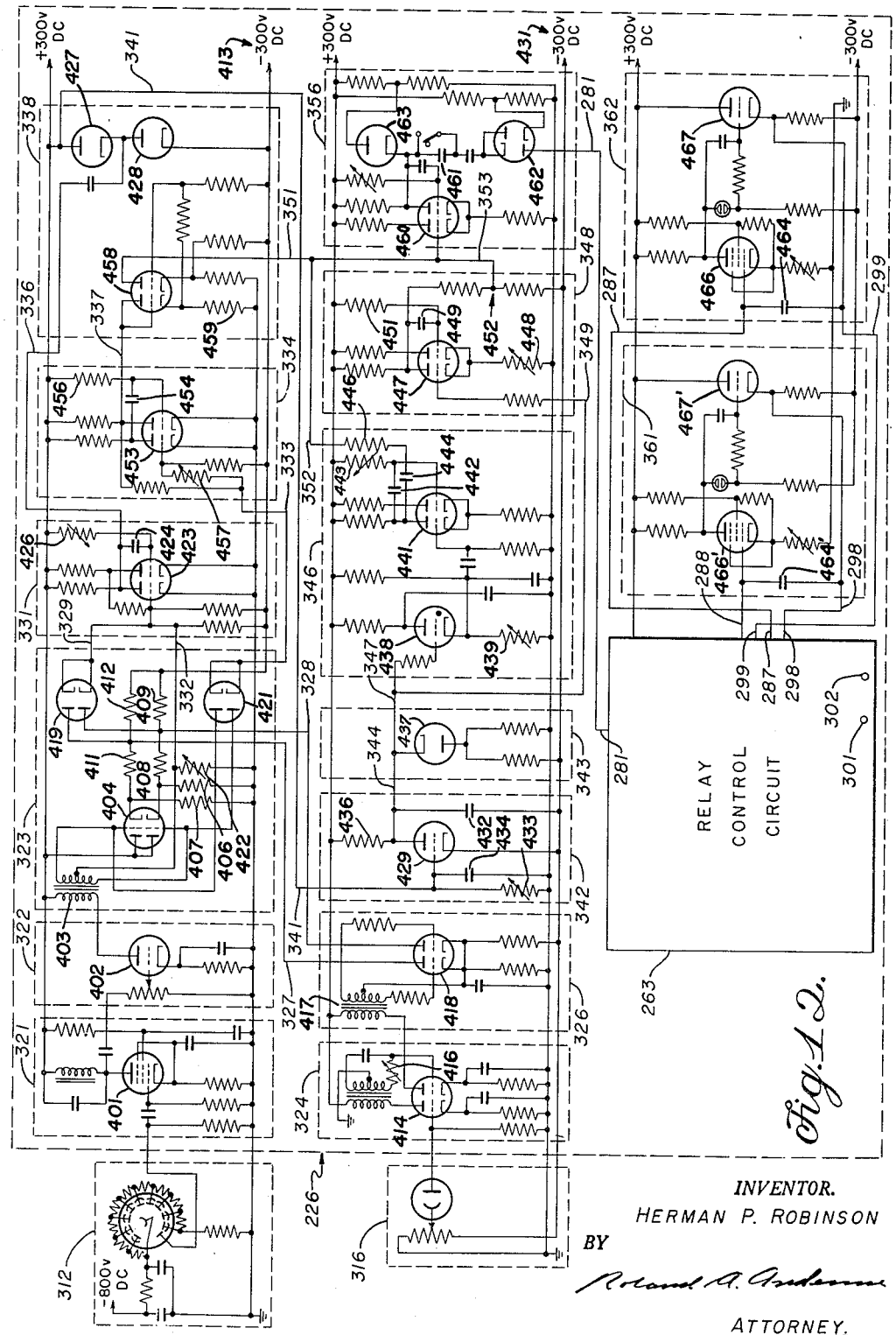

United States Patent Office 2,939,633
Patented June 7, 1960

---

2,939,633

AUTOMATIC COUNTER

Herman P. Robinson, Lafayette, Calif., assignor to the United States of America as represented by the United States Atomic Energy Commission Filed June 18, 1956, Ser. No. 592,225

7 Claims. (Cl. 235—92)

The present invention relates to a counter and more particularly to an automatic counter of alpha particle tracks as recorded by a sensitive emulsion of a photographic plate.

An alpha spectrometer is a device for determining the energy distribution of a beam of alpha particles. With such device the alpha particles are deflected magnetically and the amount of deflection is a function of the energy of the particles. The amount of deflection is recorded on a sensitive emulsion on a photographic plate which is disposed parallel to the magnetic deflection field and nearly parallel to the deflected beam. Under such condition, a small deflection results in a considerable spread in the tracks recorded in the emulsion and the tracks are parallel to each other.

Formerly, it was necessary to count the tracks with the aid of a microscope, since the tracks are of the order of ten microns in length. The counting was accomplished by determining the number of tracks in a series of narrow strips of the plate and plotting the numbers. Such method is time consuming and laborious, for some plates the counting time was several months. Even with statistical counting methods the time for one plate was sometimes a month. The need for an automatic device for counting and recording, which is rapid, is therefore evident.

It is therefore an object of the present invention to provide a new and improved method and apparatus for counting nuclear particle tracks as photographically recorded.

Another object of the invention is to provide an automatic counter of nuclear particle tracks as photographically recorded.

Still another object of the present invention is to provide modulated dark field illumination resulting in light flashes from nuclear particles recorded photographically which are then electronically counted.

A further object of the invention is to provide automatic scanning and counting of nuclear particle tracks as photographically recorded.

A still further object of the invention is to provide a source of modulated dark field illumination for photographically recorded nuclear tracks and automatically counting such tracks electronically as the photographic plate is automatically scanned in narrow strips.

Figure 2:
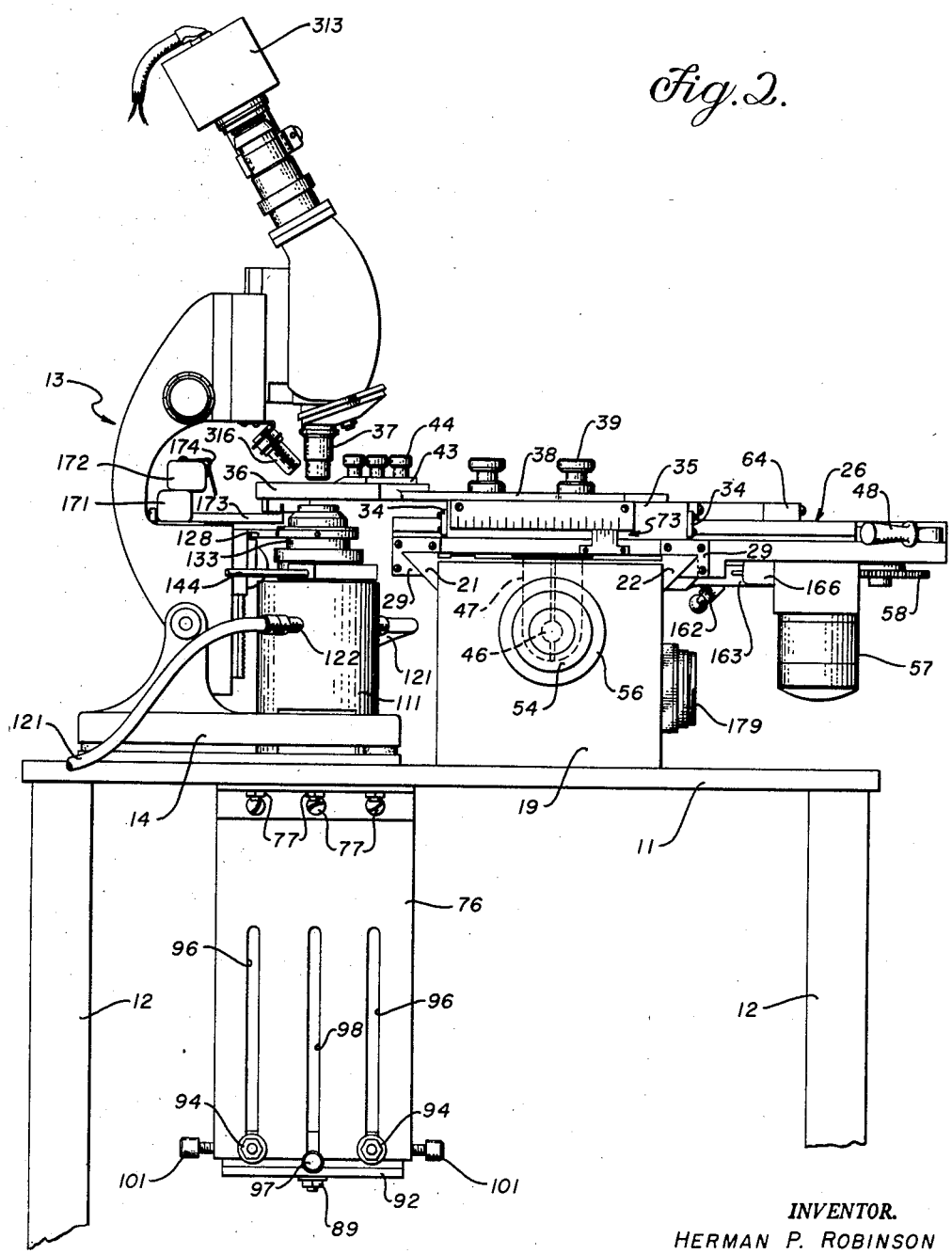
Figure 3:
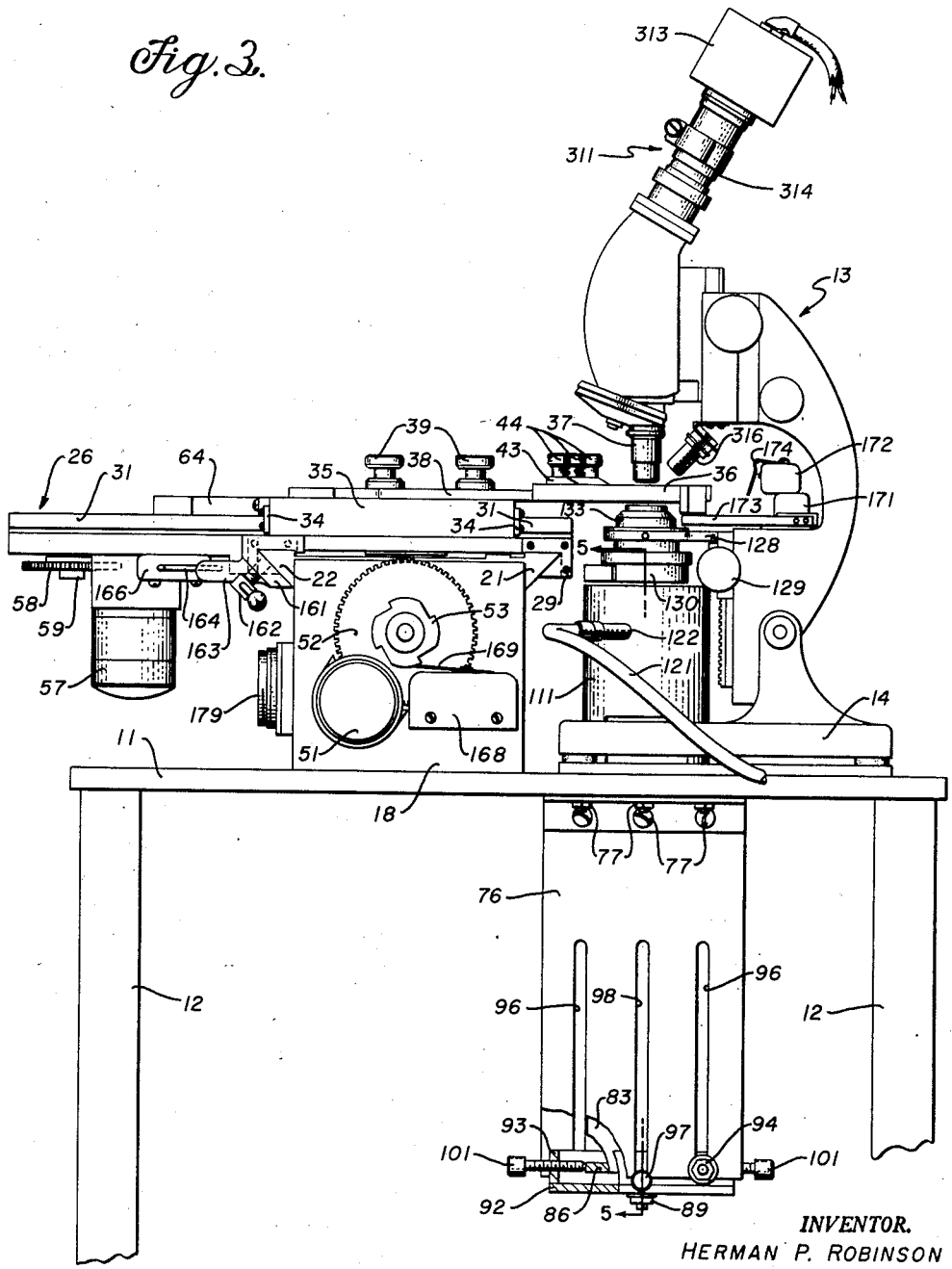
Figure 4:
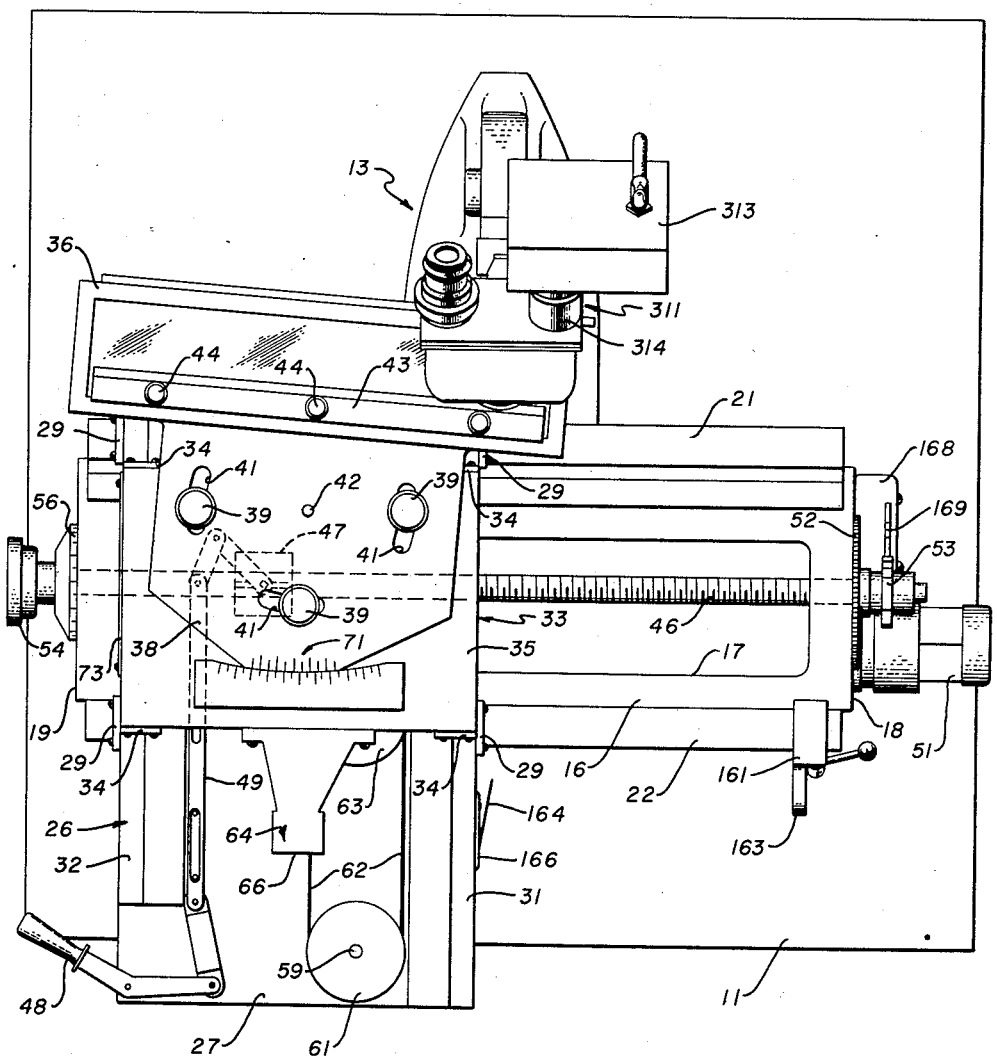
Figure 5:
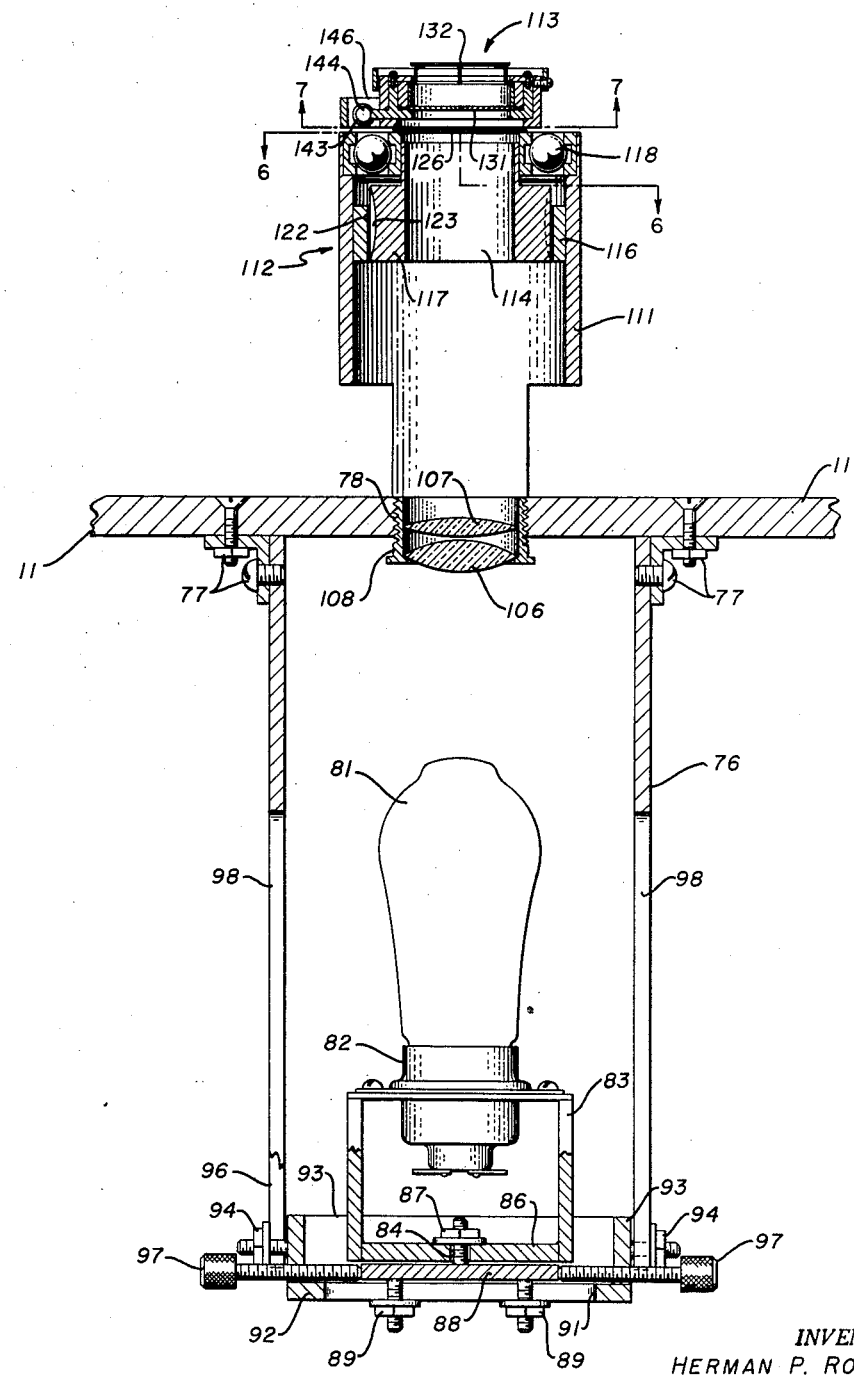
Figure 7:
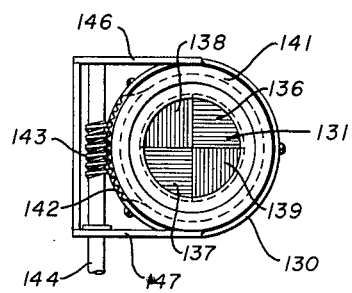
Figure 8:
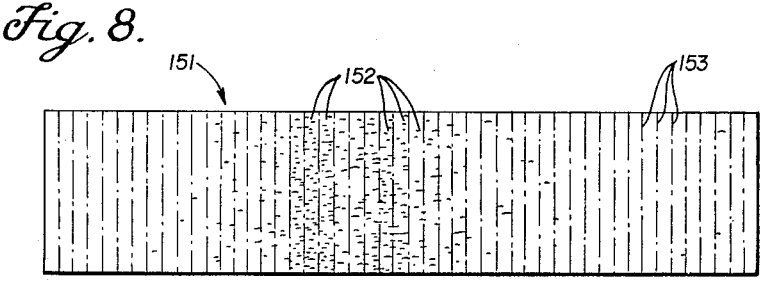
Figure 6:
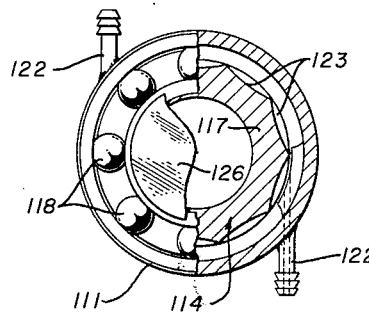
Figure 9:
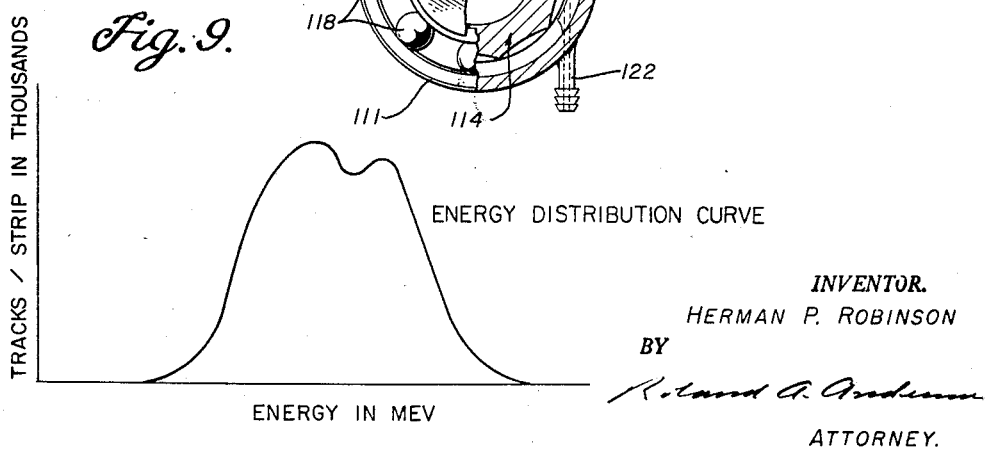
Figure 10:
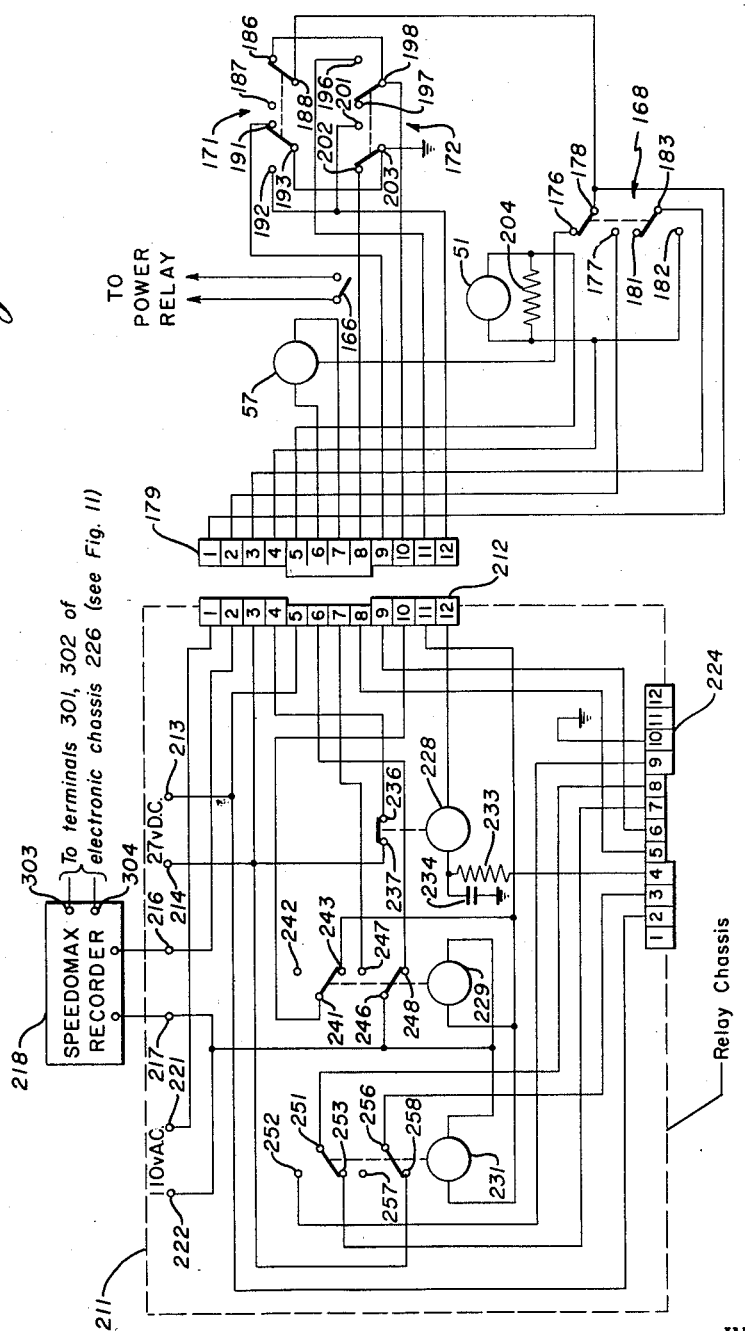
Figure 11:
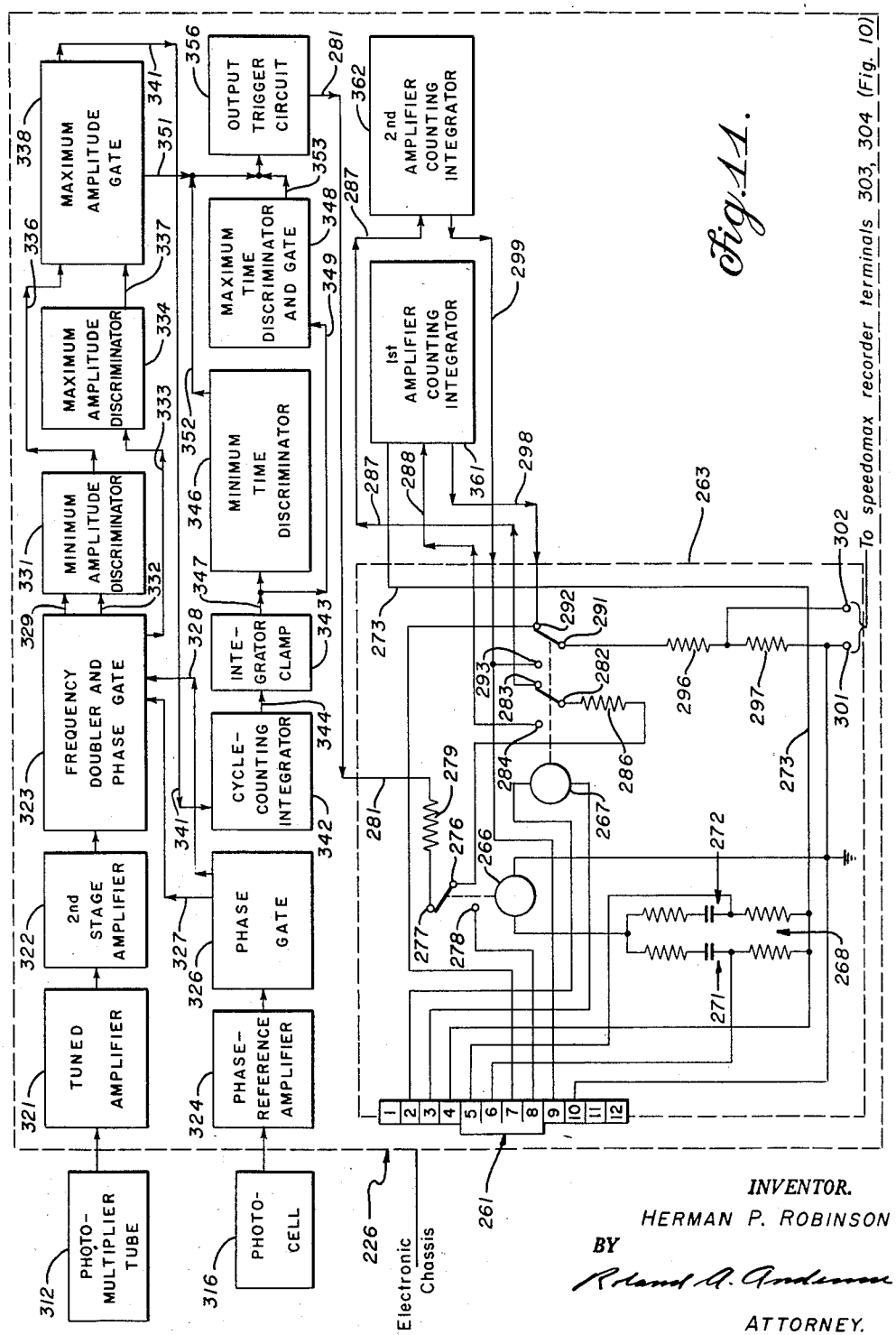

Other objects and advantages of the present invention will be apparent from the following description and claims considered together with the accompanying drawing in which:

Figure 1 is a frontal elevation of the present invention;
Figure 2 is a side elevation of the invention of Fig. 1;
Figure 3 is a second side elevation of the invention of Fig. 1;
Figure 4 is a plan view of the invention of Fig. 1;
Figure 5 is a sectional view of the light source taken along the line 5—5 of Fig. 3;
Figure 6 is a detail transverse section of the compressed air turbine taken along the line 6—6 of Fig. 5;
Figure 7 is a detail transverse section of the analyzer disk taken along the line 7—7 of Fig. 5;
Figure 8 is a photographic plate of an alpha spectrometer illustrating distribution of nuclear tracks;
Figure 9 is a distribution curve of the nuclear tracks of the plate of Fig. 8;
Figure 10 is a wiring diagram of the microswitch and relay circuits of the present invention;
Figure 11 is a block diagram of the electronic circuit of the present invention and includes a wiring diagram of the relay control circuit; and
Figure 12 is a wiring diagram of the electronic circuit of Fig. 11.

Referring now to the drawing in detail, Figs. 1 to 4 in particular, there is provided a table top 11 having a plurality of supporting legs 12 suitably mounted at the corners. A conventional binocular microscope 13, with the light stage removed, is mounted with the base 14 suitably secured to the table top 11. At elongated bed 16 having a longitudinal slot 17 is disposed parallel to the microscope 13 and is supported above the table top 11 by a pair of end plates 18, 19, respectively, mounted at the extremities of the bed. Two similar precision ways 21, 22, having a triangular cross-section, are mounted, one on each longitudinal side of the bed 16, and provide surfaces over which a carriage 26 is movable.

A base plate 27 of the carriage 26 is elongated and provided with four guide plates 29 having angular cutouts which substantially correspond to the triangular ways 21, 22. Such guide plates 29 are mounted on the base plate 27 and engage the ways 21, 22 so that the carriage 26 is maintained in a steady transverse position on the ways, but free for any sliding movement parallel to the microscope 13.

The carriage 26 is also provided with two precision ways, 31, 32, having a triangular cross-section, one mounted along each longitudinal side of the carriage transverse to the microscope 13. A plate holder 33 is slideably mounted on the ways 31, 32 by four guide plates 34, having angular cut-outs, affixed to a base plate 35 of the plate holder to engage the ways. A plate frame 36 is extended under an objective lens 37 of the microscope 13 by an arm 38 which is secured to the plate holder 33 by three knurled thumb screws 39 passed through curved slots 41 in the holder. Such curved slots 41 are dimensioned and disposed to provide an angular adjustment of the plate frame 36 beneath the objective lens 37. A stud 42 is extended from the arm 38 into the plate holder 33 to provide a fixed pivot and to prevent lateral movement of the plate frame 36 during angular adjustment. A plate retaining bar 43 is secured to one side of the plate frame 36 by a plurality of knurled thumb screws 44.

To provide a controlled movement of the carriage 26, a lead screw 46 is mounted between bearings (not shown) in the end plates 18, 19 and is extended parallel to the slot 17. A split traveler nut 47 is extended from the base plate 27 through the slot 17 to engage the lead screw 46. The jaws of the traveler nut 47 are movably mounted and a handle 48 is pivotably mounted on the base plate 27 with suitable linkage 49 extended to the traveler nut so that engagement or disengagement with the lead screw 46 is selectively accomplished. An electric motor 51 is suitably mounted on the end plate 18 and is geared to a drive gear 52 affixed to the lead screw 46. Also mounted on the lead screw 46 adjacent to the drive gear 52 is a cam 53. The other end of the lead screw 46 at the end plate 19 is terminated in drive knob 54 to provide manual adjustment and having a vernier 56 associated therewith. Thus, with the traveler nut 47 in engagement with lead screw 46, suitable energization of the motor 51 results in movement of the carriage 26 along the ways 21, 22 in a longitudinal direction with respect to the microscope 13.

For movement of the plate holder 33 a motor 57 is mounted under the base plate 27 to drive a gear 58 having an axle 59 extending through the base plate and terminating in a drive pulley 61. A continuous drive belt 62 is extended from the drive pulley 61 to an idler pulley 63 also mounted rotatably on the base plate 27. The plate holder 33 is provided with an extended arm 64 having a clamp 66 which grips the drive belt 62 between the two pulleys 61, 63. Now, by suitable excitation of the motor 57 the plate holder 33 is movable along the ways 31, 32 in a direction which is transverse to the bed 16 and microscope 13.

In addition to the vernier 56 associated with the drive knob 54 on the lead screw 46 there is provided a vernier 71 on the base plate 35 and arm 38 of the plate holder 33 to permit precise angular adjustment of the plate frame 36. Another precision adjustment is achieved by use of a vernier 73 mounted on the base plate 35 of the plate holder 33 and the base plate 27 of the carriage 26. With such verniers 56, 71, 73 the position of the plate frame 36 is accurately disposed longitudinally angularly, and transversely with respect to the objective lens 37 of the microscope 13.

With a conventional light stage of a microscope nuclear tracks on a photographic plate appear as dark lines on a bright background. Such illumination is satisfactory where the nuclear tracks are counted visually; however, for automatic electronic counting a different type of illumination is required so that the nuclear tracks appear as bright lines on a dark background. The latter type of illumination is known as dark-field illumination and is achieved by preventing the direct passage of light rays, from the circular spot of light which illuminates the field of view, into the objective lens of the microscope.

To provide such dark-field illumination, a light source housing 76 is suitably secured, as by screws 77, to the under side of the table top 11 in alignment with the objective lens 37 of the microscope 13 and with an opening 78 provided through the table top for passage of light rays. A light bulb 81, such as a zirconium arc light, is mounted in a conventional socket 82 within the housing 76. To provide adjustment of the position of the bulb 81 the socket 82 is mounted on a pedestal 83 which has a slot 84 in the base 86 thereof. Two locking screws 87 extend through the slot 84 and engage a plate 88. Two more locking screws 89 engage the plate 88 and are spaced apart along a line transverse to the position of the first referenced locking screws 87. Such second pair of locking screws 89 extend down through a slot 91 in a movable base 92 of the housing 76. The movable base 92 is provided with side plates 93 and two of the opposing side plates have locking screws 94 affixed to extend through slots 96 in the housing 76. Thus, the structure of the base 92 provides vertical adjustment of the position of the bulb 81 within the housing 76, while the arrangement of locking screws 87, 89 of the plate 88 provide longitudinal and transverse adjustment. For fine adjustment in the longitudinal direction two thumb screws 97, threadably engaging opposite sides 93 of the base 92, extend to bear against opposite sides of the plate 88 so that adjustment of the screws moves the plate parallel to the slot 91. Slots 98 are provided in the housing 76 for passage of the thumb screws 97. Also, for fine adjustment in the transverse direction two thumb screws 101, threadably engaging the other two opposing sides 93 of the base 92, extend to bear against opposite sides of the base 86 of the pedestal 83.

Two convex collimating lenses 106, 107 are provided with a mount 108 which is threadably engaged in the opening 78 of the table top 11 to project a beam of light of uniform intensity from the bulb 81 toward the objective lens 37 of the microscope 13. Mounted directly over the opening 78 and lens mount 108 is a housing 111 containing a modulation system 112 and substage condenser dark-field adapter system 113. The operation and purpose of the two systems 112, 113 will be set forth hereinafter. Mounted within the housing 111 is a compressed air turbine 114 having a stator 116, a hollow rotor 117, and a ball bearing 118. The ball bearing 118 is supported by the housing 111, as is the stator 116, and the rotor 117 is supported by the ball bearing. Thus the ball bearing 118 provides a suitable support for the rotor 117 and substantially free rotary motion of such rotor within the housing 111. Two compressed air lines 121, suitably connected to the compressed air tank (not shown) are connected to nozzles 122, respectively extended through diametrically opposed portions of the housing 111 and stator 116, to project a stream of compressed air against recessed portions 123 of the rotor 117. A Polaroid modulator disk 126 (a light-transparent lens having the property of passing light rays in a single plane) is suitably mounted on the rotor 117 to intercept light from the collimating lenses 106, 107 and pass light rays of continuously rotating polarity as the rotor revolves.

A mounting bracket 128 (see Figs. 2 and 3) is extended from the conventional substage condenser focussing system 129 of the microscope 13 to dispose a housing 130 of a Polaroid analyzer disk 131, a dark-field stop 132, and a substage condenser 133 in line with the Polaroid modulator disk 126. The Polaroid analyzer disk 131 is arranged in four quadrants (see Fig. 7) with the first and third quadrants 136, 137, respectively, providing polarization in one plane and the second and fourth quadrants 138, 139 respectively, providing polarization in a plane transverse to that of the first and third quadrants. For suitable alignment of the Polaroid analyzer disk 131, with respect to the nuclear tracks to be counted, the disk is disposed in a retaining ring 141 rotatably mounted in the bracket 128 and such retaining ring is provided with an arcuate section of gear teeth 142. A worm gear 143 is mounted on a rotatable shaft 144, suitably journaled between two arms 146, 147 extended from the housing 130, to engage the gear teeth 142.

With an elongated photographic plate 151 (see Fig. 8) having nuclear tracks 152, such as produced by an alpha spectrometer, placed in position in the plate frame 36, it is desired to have the tracks in narrow strips across the plate counted. To accomplish the foregoing a microswitch and relay circuit (see Fig. 10) are provided with the microswitches positioned to operate so that the motors 51, 57 move the photographic plate 151 beneath the objective lens 37 along successive scanning strips 153.

To limit the travel of the carriage 26 in the longitudinal direction, once the scanning has been started, a longitudinal limit stop 161 is clamped on the way 22 of the bed 16 by an engaging screw 162. An arm 163 is extended from the stop 161 to engage an actuating lever 164 of a longitudinal master limit microswitch 166 suitably mounted on carriage 26. For incremental movement of the carriage 26 during scanning a double-pole-double-throw longitudinal travel microswitch 168 is mounted on the end plate 18 with an actuating lever 169 extended to bear against the cam 53 which is mounted on the lead screw 46. With the pitch of the threads on the lead screw 46 selected to advance the carriage 26 by 1 millimeter for each rotation thereof and with the width of the scanning strips 153 across the photographic plate 151 selected at 0.25 millimeter, then the cam 53 has four alternate rise and fall portions so as to provide suitable on and off operations of the longitudinal travel microswitch 168.

For the transverse travel of the scanning there is provided an upper transverse limit microswitch 171 and a lower transverse limit microswitch 172. Both of the latter microswitches 171, 172 are double-pole-double-throw and are suitably mounted on the microscope 13, substantially on a plane with the plate frame 36. An actuating lever 173 is extended from the upper transverse limit microswitch 171 to engage a downward projection of the leading edge of the plate frame 36 when the frame has traveled away from the microscope 13. Thus, a pull on the actuating lever 173 operates the upper transverse limit switch 171. Also, an actuating lever 174 is extended from the lower transverse limit microswitch 172 to engage the leading edge of the plate frame 36 when the frame has traveled toward the microscope 13. It is therefore readily apparent that, by suitable establishment of the positions of the plate frame 36 at which the actuating levers 173, 174 are engaged, the transverse travel of the plate frame is controllable by the upper and lower transverse limit microswitches 171, 172.

The longitudinal master limit microswitch 166 is normally open and is connected in series with a power relay (not shown) which when operated serves to disconnect all electrical power to the electrical components of the present invention (see Fig. 10). The longitudinal travel microswitch 168 has a first pair of contacts 176, 177 with a common contactor 178 which operates from a normally closed position with one contact 176 to a normally open position with the other contact 177. Such normally closed contact 176 is connected to the reversible transverse motor 57 and serves as the common lead for the two windings (not shown) thereof. The normally open contact is connected to position number two of a twelve position female plug 179 suitably mounted beneath the bed 16. The common contactor 178 is connected to position number one of the plug 179. Referring again to the longitudinal travel microswitch 168 there is provided a second similar pair of contacts 181, 182 with a common contactor 183 which operates from a normally closed position with one contact 181 to a normally open position with the other contact 182. Both of the common contactors 178, 183 are ganged to operate simultaneously. The normally closed contact 181 remains unconnected and the normally open contact 182 is connected to the longitudinal motor 51 and to position number four of the plug 179. The common contact 183 is connected to position number three of the plug 179.

As set forth previously the upper transverse limit microswitch 171 is double-pole-double-throw and therefore has a normally closed contact 186 and a normally open contact 187 with a common contactor 188 in one section, as well as a normally closed contact 191 and a normally open contact 192 with a common contactor 193 in the other section. Again both common contactors 188, 193 are ganged for simultaneous operation of both sections. The normally closed contact 186 of such microswitch 171 is connected to position number ten of the plug 179, the normally open contact 187 remains unconnected, and the common contactor 188 is connected to the common contactor 178 of the first section of the longitudinal travel microswitch 168. The normally closed contact 191 of the second section of the upper transverse limit microswitch 171 is connected to position nine of the plug 179, the normally open contact 192 is connected to position twelve of such plug, and the common contactor 193 is connected to ground.

The lower transverse limit microswitch 172 is similar to the upper transverse limit microswitch 171 and is provided with a normally open contact 196, a normally closed contact 197, and a common contactor 198 in the first section and a normally open contact 201, normally closed contact 202, and a common contactor 203 in the second section. Connections of the first section of such microswitch 172 comprise a connection from the normally open contact 196 to position eleven of the plug 179, no connection of the normally open contact 197, and a connection of the common contactor 198 to position ten of the plug 179. For the second section of such microswitch 172 the normally open contactor 201 is connected to position twelve of the plug 179, the normally closed contact 202 is connected to position eight of the plug, and the common contactor 203 is connected to ground.

To complete the connection of the longitudinal motor 51 a connection is made from the motor to position five of the plug 179 and a braking resistor 204 is connected between the two described motor connections. Also, to complete the connection of the reversible transverse motor 57, one winding is connected to position six of the plug 179 and the other winding is connected to position seven of the plug.

A relay chassis 211 is provided with a male plug 212 having twelve positions which correspond to the female plug 179 mounted under the bed 16. A twelve conductor cable (not shown) with corresponding plug fittings (not shown) may be connected between the two described plugs 179, 212 for remote positioning of the relay chassis 211. Two terminals 213, 214 are also provided on the chassis 211 for external connection to a suitable source of 27 volts, direct current. A second set of two terminals 216, 217 are provided for external connection to suitably energize a speedomax recorder 218. Another two terminals 221, 222 are mounted on the chassis 211 for connection to a source of 110 volts, alternating current. There is also provided a second twelve position plug 224 (female) on the chassis 211 for connection to an electronic chassis 226 (see Fig. 11).

Position number one of the plug 212 is connected to the alternating current terminal 221 and position number two is connected to the terminal 216 while the other terminal 217 is connected to the second alternating current terminal 222. A connection is made from position number three of the plug 212 to the negative direct current terminal 214 and a connection is made from position number five to the positive direct current terminal 213 which is connected to position number two of the other plug 224. Position numbers eight and nine of the plug 212 are directly connected to position numbers five and six, respectively, of the other plug 224 leading to the electronic chassis 226.

Suitably mounted within the chassis 211 is a longitudinal motor starting relay 228, a transverse motor reversing relay 229, and an integrator changeover relay 231. One side of the solenoid of the longitudinal motor starting relay 228 is connected to position number twelve of the plug 212 leading to the motor circuit and the other side of the solenoid is connected through a resistor 233 to position number four of the other plug 224. A charging capacitor 234 is connected from the junction of the resistor 233 and solenoid of the relay 228 to ground. Two normally closed contacts 236, 237 of the relay 228 are provided with one contact 236 connected to position number four of the male plug 212 and with the other contact 237 connected to the negative direct current terminal 214.

The solenoid of the reversing relay 229 and the solenoid of the integrator changeover relay 231 are connected in parallel between position eleven of the male plug 212 and the second alternating current terminal 222. The reversing relay 229 is provided with a first contactor 241 which operates between an unconnected normally open contact 242 and a normally closed contact 243. The contactor 241 is connected to position number ten of the male plug 212 and the normally closed contact 243 is connected to position number eleven of such plug. A second contactor 246 which operates between a normally open contact 247 and a normally closed contact 248 is also provided in the relay 229. The normally closed contact 248 is connected to position number six of the male plug 212, the normally open contact 247 is connected to position number seven of such plug, and the contactor 246 is connected to the second alternating current terminal 222.

The integrator changeover relay 231 is provided with a first contactor 251 which operates between a normally open contact 252 and a normally closed contact 253. The first contactor 251 of such relay is connected to position number eight of the female plug 224, the normally open contact 252 is connected to position number nine of the same plug, and the normally closed contact 253 is connected to position number seven of such plug. A second contactor 256 is provided in the integrator changeover relay 231 and operates between an unconnected normally open contact 257 and a normally closed contact 258. The second contactor 256 is connected to position number three of the female plug 224 and the normally closed contact 258 is connected to the negative direct current terminal 214. Position numbers one, eleven, and twelve of the female plug 224 remain open and position number ten is connected to ground.

A twelve position male plug 261 (see Fig. 11), matching the female plug 224 of the relay circuit 211, is provided on the electronic chassis 226 and connects to a relay control circuit 263. Position numbers one, eleven, and twelve of such plug 261 are open and position number ten is connected to ground. Disposed within the relay control circuit 263 is an integrator reset relay 266 and a second integrator changeover relay 267, both of which are double-pole-double-throw. One side of the solenoid of the integrator reset relay 266 is connected to ground and the other side is connected to an energizing circuit 268 comprising two balanced parallel branches 271, 272, each having a series-connected first resistor charging capacitor, and second resistor, terminated at a 300 volt, direct current, conductor 273. The junction between the resistor, connected to the conductor 273, and the capacitor of one of the branches 271 is connected to position number six of the male plug 261 and the similar junction of the other branch 272 is connected to position number five of the same plug. Position number four of the male plug 261 is connected to the 300 volt, direct current, conductor 273. Also, position number two of the male plug 261 is connected to one side of the solenoid of the second integrator changeover relay 267 and position number three of the plug is connected to the other side of the relay.

The integrator reset relay has a contactor 276 which operates between a normally closed contact 277 and a normally open contact 278 with the former contact 277 connected through a current limiting resistor 279 to a signal lead 281 and the latter contact 278 connected to position number eight of the male plug 261. A first contactor 282 is provided in the second integrator changeover relay 267 and operates between a normally closed contact 283 and a normally open contact 284. The first contactor 282 is connected through a second current limiting resistor 286 to the contactor 276 of the integrator reset relay 266, the normally closed contact 283 is connected to a lead 287, and the normally open contact 284 is connected to a second lead 288. A second contactor 291 is provided in the same relay 267 and operates between a normally closed contact 292 and a normally open contact 293. The contactor 291 is connected to ground through two series-connected resistors 296, 297, the normally closed contact 292 is connected to a lead 298 and to position number seven of the male plug 261, and the normally open contact 293 is connected to a lead 299 and to position number nine of the male plug 261. Two terminals 301, 302 are provided as the output of the electronic chassis 226 and one such terminal 301 is connected to ground and the other such terminal 302 is connected to the junction between the two series-connected resistors 296, 297. Externally the two terminals 301, 302 are connected to signal terminals 303, 304 of the speedomax recorder 218.

To convert light flashes from the photographic plate 151 into electric pulses, one eyepiece 311 of the microscope 13 is converted by removing the optical lens system and replacing same with a plate (not shown) having a narrow light collimating slot backed by a photomultiplier tube 312 mounted within a housing 313 suitably supported on the eyepiece barrel 314. The light collimating slot is aligned with the longitudinal dimension of photographic plate 151 and has a length substantially equal to the desired width of the scanning strips 153 across plate 151 (see Figure 8). Accordingly, a slot length of, for example, 0.25 millimeter, defines a width of 0.25 millimeter for each transverse scanning strip 153. Also, to develop a phase reference voltage a photocell 316 is mounted on the microscope 13 and disposed to receive direct light from the substage condenser 133 through the photographic plate 151.

The output of the photomultiplier tube 312 is amplified through a tuned amplifier 321 and a second stage amplifier 322 which are cascade-connected to the tube. The output of the second stage amplifier is then connected to the input of a frequency doubler and phase gate 323. To control the operation of the frequency doubler and phase gate 323 the output of the photocell 316 is connected to a phase reference amplifier 324 the output of which is connected to a phase gate 326. Such phase gate 326 develops two variable phase signals which are separately connected to the frequency doubler and phase gate 323 by leads 327, 328, respectively. A first signal output lead 329 is connected from the frequency doubler and phase gate 323 to a minimum amplitude discriminator 331, the minimum amplitude of which is determined by a control voltage also connected to the discriminator from the frequency doubler and phase gate by a control lead 332. A second signal output lead 333 of the frequency doubler and phase gate 323 is connected to a maximum amplitude discriminator 334. An output lead 336 of the minimum amplitude discriminator 331 and an output lead 337 of the maximum amplitude discriminator 334 are separately connected to a maximum amplitude gate 338. A first output lead 341 of the maximum amplitude gate 328 is connected to a cycle counting integrator 342 which is, in turn, connected to an integrator clamp 343 by a lead 344. The output of the integrator clamp 343 is connected to a minimum time discriminator 346 by a lead 347 and to a maximum time discriminator and gate 348 by a lead 349. An output lead 351 of the maximum amplitude gate 338, an output lead 352 of the minimum time discriminator 346, and an output lead 353 of the maximum time discriminator and gate 348 are connected together and further connected to the input of an output trigger circuit 356, the output of which is connected to the signal lead 281 of the relay control circuit 263. A first direct current amplifier counting integrator 361 has an input connected to lead 288 and an output connected to lead 298 in the relay control circuit 263. A second direct current amplifier counting integrator 362, operating alternately with the first (361), has an input connected to lead 287 and an output connected to lead 299 of the relay control circuit 263.

Consider the operation of the present invention, as described above, with a photographic plate 151 having nuclear tracks 152 mounted in the plate frame 36. The carriage 26 is positioned, by movement of the drive knob 54, at the furthermost position along the longitudinal ways 21, 22 from the longitudinal motor 51, as illustrated in Fig. 4. The plate holder 33 is moved to the limiting position away from the microscope 13 along the transverse ways 31, 32. Under such circumstances the scanning operation is commenced upon energization of the power supplies for the relay chassis 211 and the electronic chassis 226.

The light bulb 81 is suitably connected to a source of electric power (not shown) and is selected for the uniformity of light projected over the area encompassed by the collimating lenses 106, 107. The compressed air turbine 114 is started and rotates, in the present instance, at a speed of 18,000 revolutions per minute. Since the Polaroid modulator disk 126 is mounted on the hollow rotor 117 of the turbine 114 and receives light projected through the rotor by the collimating lenses 106, 107, the plane of polarization of the light projected through the disk 126 rotates with an angular velocity of 18,000 revolutions per minute. The polarized light proceeding up from the Polaroid disk 126 is blocked by one pair of opposing quadrants of the Polaroid analyzer disk 131 when the light is transmitted by the other pair of opposing quadrants. Since the Polaroid modulator disk 126 rotates and the Polaroid analyzer disk 131 is held stationary, the light transmitted by one pair of the analyzer quadrants varies as the sine squared of the angle the modulator disk makes with any arbitrary stationary reference. The other pair of quadrants of the analyzer disk 131 transmits light varying as the cosine squared of the modulator disk 126 angle. Thus, when one pair of quadrants is transmitting a maximum of light, the other pair is transmitting no light, and vice versa. The Polaroid analyzer disk 131 is oriented, by means of the rotatable shaft 144, so that light from one pair of quadrants strikes the nuclear particle tracks 152 broadside and the light from the other pair of quadrants strikes the tracks end on when the axis of the photographic plate 151 is disposed perpendicular to the optic axis of the microscope 13. The angularly adjustable mounting of the arm 38 on the base plate 35 of the plate holder 33 provides means for accomplishing the latter condition.

Dark-field illumination is achieved by a circular dark-field stop 132 centered over the Polaroid analyzer disk 131 and suitably mounted on a plane with the iris (not shown) of the substage condenser 133. Such dark-field stop 132 has a diameter less than the diameter of the iris opening so that a hollow cylinder of light is projected to the substage condenser 133. A hollow cone of light is then provided above the substage condenser 133 and extended to the image plane, or photographic plate 151. Above the photographic plate 151 the divergent light rays form a second, but inverted, hollow cone wherein the objective lens 37 of the microscope 13 is disposed. With such relationship between the light rays and the objective lens 37, it is readily apparent that the only way for light to enter the objective lens is for scattering to occur in the image plane of the substage condenser 133 (i.e., at the photographic plate 151). The light rays are scattered by a nuclear particle track 153 on the photographic plate located in the field of view of the objective lens 37. Thus, a nuclear particle track 153 appears light on a dark background when illuminated broadside by the revolving polarized light. Because of the modulation the nuclear particle track 153 appears to flash twice during each revolution of the Polaroid modulator disk 126. Thus, a 18,000 revolution per minute rotation of the Polaroid modulator disk 126 produces a 600 cycle per second signal at the photomultiplier tube 312.

Under conditions as outlined above the upper transverse limit microswitch 171 has been actuated to ground the starting capacitor 234 which has been previously charged by connection to the 300 volt, direct current, conductor 273. The discharge path of the starting capacitor 234 includes the solenoid of the longitudinal motor starting relay 228 and current flow through such relay solenoid closes the contacts 236, 237 to start the longitudinal travel motor 51. The longitudinal motor starting relay 228 remains closed long enough for the longitudinal travel motor 51 to turn the cam 53 sufficiently to actuate the longitudinal travel microswitch 168. Simultaneously with the foregoing the ground connection, to the capacitor in the branch 271 in the circuit of the solenoid of the integrator reset relay 266, is removed to actuate the relay. Also, at the same time, the contactor 188 of the upper transverse limit microswitch 171 breaks connection with the contact 186, which action de-energizes the reversing relay 229 and the integrator changeover relay 231. The contactor 246 of the reversing relay 229 changes position to set the circuit of the transverse motor 57 for rotation to move the plate holder 33 toward the microscope 13.

As stated previously the cam-operated longitudinal travel microswitch 168 has been actuated and such action moves the contactor 178 of the switch away from the contact 176 to disconnect the common lead of the transverse motor 57 and to the contact 177 to energize the speedo-max recorder 218. Also, the contactor 183 of the microswitch 168 moves from the unconnected contact 181 to the contact 182 to provide a closed circuit in parallel with the contacts 236, 237 of the longitudinal motor starting relay 228 so that the longitudinal motor remains running after the starting capacitor 234 has discharged and the relay becomes de-energized to open the contacts 236, 237. When the longitudinal motor 51 has turned the lead screw 46 one-quarter of a revolution the cam 53 causes the contactors 178, 183 to change position. Such action results in the opening of the circuit of the longitudinal motor 51, which stops almost instantly because of the braking resistor 204, and in the closing of the common lead of the transverse motor 57 through the contact 176 and the contactor 178.

The transverse motor 57 continues operating and moves the photographic plate 151 under the objective lens 37 of the microscope 13 until the leading edge of the plate frame 36 presses against the actuating lever 174 of the lower transverse limit microswitch 172. It is to be noted that, as soon as the pull on the actuating lever 173 of the upper transverse limit microswitch 171 is released, the contactors 188, 193 revert to the normal position described above. Pressure against the actuating lever 174 causes the contactors 198, 203 of the lower transverse limit microswitch 172 to change position so that one contactor 198 moves from the unconnected contact 197 to the other contact 196 to energize the solenoids of the reversing relay 229 and the integrator changeover relay 231. Also, the other contactor 203 moves from the normally closed contact 202 to open the ground connection to the capacitor in the other branch 272 in the circuit of the solenoid of the integrator reset relay 266 to energize the relay. Such contactor 203 then moves to bear against the normally open contact 201 to complete the circuit of the discharge path of the starting capacitor 234 through the longitudinal motor starting relay 228. The longitudinal motor 51 then commences to rotate and the cam 53 rotates to operate the longitudinal travel limit microswitch 168. Upon actuation of such longitudinal travel limit microswitch 168 the operation of the relay circuit is the same as described previously except that the transverse motor 57 is set to rotate in the opposite direction and move the plate holder 36 away from the microscope 13.

Thus, with the connections and operation as set forth, the photographic plate 151, disposed in the plate frame 36, is moved under the objective lens 37 of the microscope 13 along a plurality of transverse scanning strips. The previously mentioned plate with light collimating slot (not shown) therein disposed within eyepiece barrel 314 of the microscope, projects light passing through the photographic plate as viewed by the objective lens into the photomultiplier tube 312. The plate within barrel 314 hence blocks light from all portions of the field except for a minute area of the photographic plate 151 defined by the dimensions of the light collimating slot. Inasmuch as the slot is oriented parallel to the longitudinal dimension of the photographic plate, the slot length defines the width of each transverse scanning strip 153 across the photographic plate as same is moved transversely beneath the objective lens of microscope 13. At the end of each transverse movement of the photographic plate 151 by the transverse motor 57, the longitudinal motor 51 operates to move the plate to the next successive scanning strip position, such longitudinal motor displacing the photographic plate in the longitudinal direction by an amount substantially equal to the length of the light collimating slot. When the entire photographic plate 151 has been scanned, the actuating lever 164 of the master limit switch 166 bears against the extended arm 163 of the longitudinal limit stop 161 and the power relay (not shown) is energized to disconnect all power to the apparatus.

Light flashes from the nuclear particle tracks 152 are converted to electrical pulses by the photomultiplier tube 312. The transverse motor 57 has a substantially low speed (2 revolutions per minute) with the result that each nuclear particle track 152 will flash a number of times during the scanning process. Thus, several cycles of a 600 cycle per second signal are developed for each scanned nuclear particle track at the output of the photomultiplier tube 312. Such signal is then amplified by the tuned amplifier 321, which has a narrow band pass corresponding to the frequency (600 c.p.s.) of the signal, and is further amplified by the second stage amplifier 322.

The frequency doubler and phase gate 323 receives an input signal from the second stage amplifier 322 and doubles the frequency of the signal to 1200 cycles per second. To eliminate signals from tracks 152 which are not parallel to the longitudinal edges of the photographic plate 151, a phase reference voltage is developed by the photocell 316 which is illuminated by the direct light from the substage condenser 133. It is to be noted that, if a nuclear particle track 152 makes more than a 45 degree angle with the edge of the photographic plate 151, the signal developed is 180 degrees out of phase with the signal from a track parallel to the edge of the plate when the frequency of the signal is doubled. To utilize the latter relationship to exclude signals developed from such non-parallel tracks, the output of the photocell 316 is amplified by the phase-reference amplifier and in amplified form applied to the input of the phase gate 326. Provision is also made within the phase-reference amplifier 324 for varying the phase through 180 degrees. The phase gate 326 develops two gate voltages from the output of the phase-reference amplifier 324 and such gate voltages are connected to the frequency doubler and phase gate 323 by two leads 327, 328, respectively, to render the latter conductive to pass signals only during the time of the gate voltages. Thus, those signals which have an improper phase relationship, such as those from the above-referenced non-parallel tracks, are eliminated.

The output signal of the frequency doubler and phase gate 323 as applied to the minimum amplitude discriminator 331 by the lead 329 is full-wave rectified. The minimum amplitude discriminator is a trigger circuit with a time constant which provides a recovery time less than the time between each successive pulse of the input signal. The other lead 332 connected between the frequency doubler and phase gate 323 and the minimum amplitude discriminator 331 provides a voltage which determines the minimum voltage of the signal to be passed by the discriminator. A second output lead 333 applies a full-wave rectified signal (ungated) from the frequency doubler and phase gate 323 to the input of the maximum amplitude discriminator 334 which is similar to the minimum amplitude discriminator 331 except that the minimum voltage required to operate the trigger voltage is set at a higher value of the signal. If the input signal has too high a value to have been developed from a single nuclear particle track 152, the maximum amplitude discriminator 334 operates to provide a gate voltage at the output lead 351. Also, the maximum amplitude gate 338 receives an input voltage by the lead 336 from the minimum amplitude discriminator 331 and provides rectification of such voltage to pass only the negative portion thereof to the lead 341. The voltages of the leads 336, 337 from the two discriminators 331, 334, respectively, remain independent throughout the operation of the circuits of the maximum amplitude gate 338 to develop the two described outputs at the leads 341, 351.

The negative voltage of the lead 341 is applied to the cycle-counting integrator 342 which provides a voltage proportional to the length of a train of uninterrupted negative pulses of voltage and becomes reset for a succeeding train of pulses by an interruption of the first train. The proportional voltage of the cycle-counting integrator is connected to the integrator clamp 343 by the lead 344 and the clamp merely provides the reference level of the proportional voltage. The output of the integrator clamp 343 is connected by the lead 347 to the input of the minimum time discriminator 346 which operates when the applied voltage (of the lead 347) reaches a minimum value (in the present instance, a value proportional to ten uninterrupted signals at the input to the cycle-counting integrator 342) to provide a delayed positive pulse at the output lead 352. The proportional voltage of the lead 347 at the output of the integrator clamp 343 is also connected, by the lead 349, to the maximum time discriminator and gate 348 which operates when the proportional voltage reaches a higher value than that required to operate the minimum time discriminator 346 (in the present instance, a value proportional to fifteen uninterrupted signals at the input to the cycle counting integrator 342). Upon operation of the maximum time discriminator and gate 348 a negative voltage is developed and appears at the output lead 353.

The lead 351 of the maximum amplitude gate 338, the lead 352 of the minimum time discriminator 346, and the lead 353 of the maximum time discriminator and gate 348 are connected together as the input to the output trigger circuit 356. The output trigger circuit 356 is only actuated by the voltage applied by the lead 352 from the minimum time discriminator 346 in the absence of voltages from the maximum amplitude gate 338 and the maximum time discriminator and gate 348, the latter voltages having negative values sufficient to lower the positive value of the former voltage below the value required for operation of the output trigger circuit. Hence for trains of from 10 to 14 uninterrupted pulses applied to cycle counting integrator 342, the voltages proportional to the numbers of pulses, or lengths of such trains, as developed by the integrator and applied through integrator clamp 343 are sufficient to trigger minimum time discriminator 346 but not maximum time discriminator and gate 348. Accordingly a pulse is produced in the output lead 352 from minimum time discriminator 346 whereas no pulse is produced in the output lead 353 from maximum time discriminator and gate 348. Output trigger circuit 356 is in turn actuated under the foregoing circumstances where pulse trains having from 10 to 14 pulses are applied to cycle counting integrator 342 provided a pulse has not been coincidentally produced in output lead 351 from maximum amplitude gate 338.

The pulse developed by the output trigger circuit 356 is connected to the lead 281 which, in turn, is alternately connected to the first and second amplifier counting integrator 361, 362, by the action of the two integrator changeover relays 231, 267, and the integrator reset relay 266. The latter relays 231, 267, 266, also provide alternate connection of the output leads 298, 299 of the first and second amplifier counting integrator 361, 362 to the input terminals 303, 304 of the speedomax recorder 218. It is to be noted that the output of the first and second amplifier counting integrator 361, 362 is a voltage proportional to the number of pulses applied from the output trigger circuit 356 during one transverse scanning movement of the photographic plate 151 beneath the objective lens 37 of the microscope 13. An energy distribution curve of nuclear particle tracks 152 over an entire photographic plate 151 is obtained from the speedomax recorder 218 and appears as illustrated in Fig. 9.

The operation of the electronic circuit of the present invention as generally described hereinbefore with reference to the block diagram of Figure 11 will be more fully understood by reference to the detailed wiring diagram of Figure 12. As illustrated therein, the tuned amplifier 321 preferably includes a pentode 401 connected in conventional fashion with a tank circuit coupled to the plate thereof. The tank circuit is tuned to the frequency of the output signal developed by photomultiplier tube 312, which signal is coupled to the control grid of pentode 401. Tuned amplifier 321 including pentode 401 hence amplifies the photomultiplier signal and, by virtue of the tuned frequency of such amplifier, effectively removes any noise appearing in the signal.

The amplified signal output from the plate of tuned amplifier pentode 401 is coupled to the control grid of a triode 402 connected as the second stage amplifier 322 of previous mention. The output of amplifier 322 is in turn coupled as by means of an interstage transformer 403 to the input of frequency doubler and phase gate 323. More particularly, the primary winding of transformer 403 is connected in series with the plate of triode 402 and the secondary winding of the transformer is center-tapped. Thus oppositely phased alternating signals are induced between the center-tap and opposite ends of the secondary winding in response to the amplified input signal flowing through the primary winding of transformer 403.

Frequency doubler and phase gate 323 preferably includes a duo-triode 404 connected as a pair of identical cathode follower amplifiers. The oppositely phased alternating signals at the opposite ends of the secondary winding of interstage transformer 403 are respectively coupled to the first and second half grids of duo-triode 404. Such tube accordingly conducts current alternately through the first and second half sections thereof, and responsively generates proportional voltages alternately across cathode resistors 406, 407 which are in turn connected to ground. The cathodes of duo-triode 404 and proportional input signal voltages thereat are respectively also connected in energizing relation to voltage adding networks comprising series connected resistors 408, 409 and 411, 412. Resistors 409 and 412 are paired and connected to a source of negative bias as shown generally at 413.

The voltage adding networks of frequency doubler and phase gate 323 are also energized by signals proportional to the phase reference voltage generated by photocell 316 as hereinbefore described. More specifically, the phase reference signal appearing at the output of the photocell is applied to phase-reference amplifier 324 which preferably comprises a duo-triode 414 connected as a conventional tuned amplifier. A variable resistor 416 is provided in the second section grid circuit of triode 414 to facilitate adjustment of the phase shift of the amplifier in order that slight departures in the phase of the signal passed therethrough, due to imperfections in circuit elements and the like, from the original phase of the signal generated by photocell 316 may be exactly compensated. The phase reference signal is amplified by the triode 414 and is coupled by means of an interstage transformer 417 to phase gate circuit 326. Such phase gate circuit comprises a duo-triode 418 with the first and second half grids thereof respectively connected to opposite ends of the center-tapped secondary winding of transformer 417, the primary winding being series connected with the plate of phase reference amplifier triode 414. Hence, in response to the amplified phase reference current flowing in the plate circuit of triode 414, the first and second halves of phase gate duo-triode 418 are rendered alternately conducting. The plates of the duo-triode 418 are respectively connected by means of leads 327, 328 to the junctures of voltage adding resistors 411, 412 and 408, 409 of frequency doubler and phase gate 323. In response to the alternate conductions of the first and second halves of duo-triode 418, voltages proportional to the phase reference signal generated by photocell 316 are alternately generated across resistors 412 and 409. These voltages are added to the input signal voltages applied to resistors 411, 408 from duo-triode 404 to produce positive voltages alternately at the junctures of resistors 408, 409 and 411, 412 when the input signal as derived from photomultiplier 312 is in phase with the phase reference signal generated by photocell 316. As hereinbefore described, the foregoing phase conditions occur when nuclear particle tracks on photographic plate 151 are parallel to the longitudinal edge thereof. At times the input signal from photomultiplier 312 is out of phase with the phase reference signal from photocell 316, which condition occurs when a particle track is not parallel to the edge of plate 151, the signal voltages and reference voltages at resistors 408, 409 and 411, 412 are correspondingly out of phase. Consequently, the reference voltages and signal voltages are subtractive, resulting in the generation of negative voltage pulses alternately at the junctures of resistors 408, 409 and 411, 412.

The junctures of resistors 408, 409 and 411, 412 are respectively connected, within frequency doubler and phase gate 323, to the plates of a duo-diode 419, the cathodes of which are commonly connected to the output lead 329 of previous mention. The halves of duo-diode 419 are accordingly rendered alternately conducting in response to positive voltages alternately generated at the junctures of the adding resistors 408, 409 and 411, 412, whereas the duo-diode is gated off when negative voltages appear at the junctures. The phase reference voltages applied to the adding resistors thus function as permissive gates to duo-diode 419 only for in-phase relationships of the input signal relative to the reference signal. By virtue of the common cathode connection of duo-diode 419, a full wave rectified output is produced at lead 329 in response to conduction of the diode. The output is thus, in effect, a frequency doubled amplified replica of the input signal generated by photomultiplier 312 only in response to particle tracks which are parallel to the edge of photographic plate 151, signals due to non-parallel tracks having been eliminated.

Frequency doubler and phase gate 323 also preferably includes a second duo-diode 421 having its plates respectively connected to the first and second half grids of duo-triode 404. The cathodes of duo-diode 421 are commonly connected to the lead 333 of previous mention. Duo-diode 421 hence functions as a full wave rectifier and produces in lead 333 a frequency doubled replica of the amplified input signal as applied to duo-triode 404 by interstage transformer 403. It will be appreciated that the signal in lead 333 includes components due to nonparallel particle tracks at photographic plate 151 as well as the components due to parallel tracks and such signal is employed for purposes which are subsequently described in detail.

Considering now again the output signal in lead 329, it will be recalled that such signal is applied to minimum amplitude discriminator 331, with lead 332, which is connected to the center tap of interstage transformer 403, providing the reference level to such signal. The reference level, moreover, is rendered adjustable by a variable resistor 422 connected between lead 332 and ground. Minimum amplitude discriminator 331 is preferably provided as a trigger circuit, such as a conventional biased multivibrator including duo-triode 423 as depicted in Figure 12. The reference level of lead 332 is adjusted by means of variable resistor 422 to a value such that the multivibrator duo-triode 423 is triggered in response to a minimum amplitude of signal in lead 329 corresponding to a predetermined minimum intensity of light due to a single particle track as viewed by photomultiplier 312. Low level spurious signals such as noise having amplitudes less than the above-noted minimum amplitude threshold level of duo-triode 423 are accordingly eliminated by the minimum amplitude discriminator 331. Signals having amplitudes greater than the threshold level trigger the duo-triode 423 and produce a fixed negative rectangular pulse output in lead 336 connected thereto. The plate to grid coupling capacitor 424 and variable grid resistor 426 connected to duo-triode 423 are adjusted to provide a time constant whereby the recovery time of the multivibrator is less than the time between each successive pulse of the input signal applied to the duo-triode from lead 329. Thus each pulse of the input signal having an amplitude greater than the minimum amplitude threshold level correspondingly produces an output pulse in lead 336.

The negative pulse output from the minimum amplitude discriminator appearing in lead 336 is applied to a pair of series connected clamping diodes 427, 428 (shown as a portion of the maximum amplitude gate 338). More specifically lead 336 is capacitively coupled to the juncture of the cathode and anode respectively of diodes 427, 428, and the anode of diode 427 is in turn connected via lead 341 to the input of cycle counting integrator 342. Diode 427 conducts in response to the negative pulses of the signal from lead 336 to thereby apply same to the cycle counting integrator. Spurious positive pulses in the signal, however, cause diode 428 to conduct and are accordingly by-passed therethrough.

Cycle counting integrator 342 is best provided as a triode 429 which is rendered normally conducting by virtue of the cathode thereof being connected to a negative bias as shown generally at 431. A charging capacitor 432 connected between the plate of triode 429 and negative bias 431 is accordingly normally continuously discharged through the triode. The lead 341 from diode 427, however, is connected to the grid of triode 429 and the negative pulses of the clamped minimum amplitude discriminator signal as applied through lead 341 drive the triode far below cut-off. Moreover, grid resistor 433 and capacitor 434 are adjusted such that the grid voltage of triode 429 fails to recover sufficiently to place the tube in conduction before the next pulse in the consecutive train from lead 341 again drives the grid far below cut-off. As long as the grid remains below cut-off (i.e., during a train of consecutive pulses from minimum amplitude discriminator 331) capacitor 432 charges through plate resistor 436 at a rate that depends upon the values thereof. This voltage rise is approximately linear over the range utilized whereby the output pulse potential at the plate of triode 429 is proportional to the length of the pulse train from the minimum amplitude discriminator 331. In the absence of two consecutive pulses from discriminator 331 (i.e., when the pulse train is interrupted) the grid voltage at triode 429 recovers sufficiently to render the tube conducting. Capacitor 432 is discharged through triode 429 to a fixed reference level as determined by a clamping diode 437 connected to the plate of triode 429 and comprising integrator clamp 343 of previous mention. The counting integrator 342 is thus reset for subsequent response to a succeeding train of pulses upon interruption of the previous pulse train.

The output from integrator clamp 343 at the cathode of diode 437, and therefore the plate of integrator triode 429, is applied through lead 347 as previously described to minimum time discriminator 346. This discriminator preferably includes a trigger thyratron 438 having its control grid energized by lead 347 and its cathode connected through a variable bias adjusting resistor 439 to ground. The resistor 439 is in turn connected to one control grid of a duo-triode 441 connected as a conventional multivibrator. Variable resistor 439 may accordingly be adjusted to set the triggering level of thyratron 438 to a value corresponding to the potential produced at lead 347 by a pulse train consisting of a predetermined number of consecutive pulses as produced by minimum amplitude discriminator 331. In accordance with the example of previous mention, the resistor 439 is adjusted such that a pulse train of at least ten successive pulses (which condition occurs for a normal track upon photographic plate 151) produces a potential at lead 347 of sufficient magnitude to trigger thyratron 438. Triggering of the thyratron in turn triggers multivibrator duo-triode 441 to produce a negative rectangular pulse at the first section plate thereof. The duration of the negative pulse is rendered adjustable for purposes subsequently described by the variable time constant of plate-to-grid coupling capacitor 442 and variable grid bias resistor 443. The negative output pulse is differentiated across capacitor 444 and resistor 446 connected in series between the first half anode of duo-triode 441 and the output lead 352 of previous mention. By virtue of the differentiating action, a positive trigger pulse is provided in lead 352 from the trailing edge of the negative output pulse at multivibrator duo-triode 441, with the position of the positive trigger pulse in time relative to the pulse output from minimum time discriminator 342 being determined by the adjustable duration of the negative pulse from the multivibrator. The positive trigger pulse is applied via lead 352 to the input of output trigger circuit 356 as hereinbefore mentioned and functions therein in a manner which is subsequently described.

The input of output trigger circuit 356 is also energized by pulses from the maximum time discriminator 348 as applied through lead 353. Such maximum time discriminator is best provided as a duo-triode 447 connected as a conventional multivibrator. The control grid of the first section of such duo-triode is responsively energized by the pulse output from cycle counting integrator 344 and integrator clamp 343 as applied through output lead 349. More specifically, output lead 349 is coupled between the common connection of the plate of triode 429 and cathode of diode 437, and the first section control grid of duo-triode 447. The triggering level of multivibrator duo-triode 447 is rendered adjustable by a variable resistor 448 commonly connected between the cathodes of the duo-triode and ground. Variable resistor 448 is adjusted to establish a triggering level which corresponds to a potential of the pulse output from cycle counting integrator 342 as produced by a pulse train of excessive predetermined length generated by minimum amplitude discriminator 331. In the example of previous mention wherein a pulse train of sixteen uninterrupted pulses was considered as being indicative of something at photographic plate 151 having greater transverse dimensions than a particle track, variable resistor 448 would be set to establish a triggering level corresponding to the potential to which the plate of cycle counting integrator triode 429 rises in response to sixteen uninterrupted pulses applied to the control grid thereof. Consequently, in response to a pulse potential in lead 349 exceeding the predetermined triggering level, multivibrator duo-triode 447 is triggered and remains in a conductive state for a time determined by the time constant of plate-to-grid coupling capacitor 449 and grid bias resistor 451. During conduction periods of duo-triode 447 a negative gate pulse is produced across voltage dividing resistor 452 which is connected in series with the first section plate circuit of the duo-triode. Such negative gate pulses comprise the energizing input applied to output trigger circuit 356 via lead 353. The duration of the negative pulse from the minimum time discriminator multivibrator duo-triode 441 is adjusted in the manner previously described to be sufficiently long whereby the positive trigger pulse produced by the trailing edge of the negative pulse is coincident with a portion of the negative gate pulse produced by the maximum time discriminator duo-triode 447. The negative gate pulse may then be employed in output trigger circuit 356 as a disabling gate to the corresponding positive trigger pulse applied thereto from the minimum time discriminator 346.

A third input is applied to output trigger circuit 356 through lead 351 as hereinbefore generally described, such third input being developed by the maximum amplitude discriminator 334 and maximum amplitude gate 338. The function of the third input is to disable the output trigger circuit when the input signal, as received by photomultiplier 312, is of too large an amplitude to have been generated by a single particle track. As regards the details of the foregoing circuits, it is to be noted that the maximum amplitude discriminator is preferably provided as a multivibrator which is generally similar in construction to the minimum amplitude discriminator 331. More specifically, maximum amplitude discriminator 334 includes a duo-triode 453 connected as a conventional delay multivibrator with the plate-to-grid coupling capacitor 454 and grid bias resistor 456 thereof selected in value to provide a time constant such that the recovery time of the multivibrator is less than the time between successive pulses produced in frequency doubler and phase gate 323. The pulsed output of previous mention produced in lead 333 from the frequency doubler and phase gate is coupled to the first section grid of duo-triode 453. When the amplitudes of the pulses in lead 333 exceed a predetermined triggering level, as determined by variable grid bias resistor 457, the duo-triode 453 is responsively triggered to produce corresponding positive rectangular pulses in lead 337. The triggering level of maximum amplitude discriminator 334 is set to a higher value than that of minimum amplitude discriminator 331 and corresponds to a signal magnitude which could only have been generated by more than a single particle track.

The positive pulse output appearing in lead 337 is in turn employed to trigger maximum amplitude gate 338 which responsively generates negative gate pulses in lead 351. The maximum amplitude gate preferably comprises a duo-triode 458, the first section grid and plate of which are commonly connected to lead 337 whereby such first section functions as a diode. Upon conduction of the first section of duo-triode 458 in response to positive pulses appearing in lead 337, the resulting signal produced across cathode resistor 459 is applied to the second section grid to thus render the second section also conducting. Inasmuch as the second section plate is coupled by lead 351 to a common juncture of leads 352 and 353 from minimum time discriminator 331 and maximum time discriminator and gate 348 respectively at the input to output trigger circuit 356, the second section plate is also connected to the voltage dividing resistor 452 of the maximum time discriminator and gate. Accordingly, conduction of the second section of maximum amplitude gate duo-triode 458 produces negative disabling gate pulses across voltage dividing resistor 452, and such pulses appear at the input of output trigger circuit 356.

Considering now output trigger circuit 356 in detail, it is to be noted that such circuit preferably includes a duo-triode 460 connected as a conventional delay multivibrator. The common juncture of leads 351, 352, and 353 from maximum amplitude gate 338, minimum time discriminator 352, and maximum time discriminator and gate 348 respectively, is connected to the first section grid of duo-triode 460. Accordingly, one portion of the maximum time discriminator voltage dividing resistor 452 serves as the grid bias resistor of the first section of duo-triode 460. Thus upon the occurrence of the positive trigger pulses of previous mention in lead 352 from minimum time discriminator 346, and in the absence of negative disabling gate pulses in leads 351 and 353, duo-triode 460 is rendered conducting. During non-conduction periods of duo-triode 460 occurring for example when negative disabling gate pulses in either lead 351 or lead 353 drive the first section grid far below cut-off to render same non-responsive to the positive trigger pulses, a capacitor 461 connected to the second section plate of the duo-triode is charged through the second section of a duo-diode 462 to the bias voltage applied to the second section plate of the triode. Upon conduction of the duo-triode, capacitor 461 is discharged through the second section thereof and the first section of duo-diode 462 is rendered conducting resulting in a pulsed flow of current through lead 281 connected thereto. Capacitor 461 discharges to a fixed value determined by clamping diode 463. The amount of current flowing through lead 281 and the first section of duo-diode 462 in response to trigger pulses at the grid of duo-triode 460 is consequently independent of the wave shape at the second half plate thereof and is accurately determined by the bias voltage thereat and the fixed voltage value established by clamping diode 463. Hence a constant fixed amount of pulsed current flows in lead 281 each time a trigger pulse due to a particle track at photographic plate 151 appears in lead 351 to output trigger circuit 356. If the pulse is due to too large a signal to have been generated by a single particle track, the resultant coincident disabling gate pulse generated in maximum amplitude gate 338 and applied through lead 351 gates the output trigger circuit 356 off and no current flows in lead 281. Similarly, if the pulse is due to an object at the photographic plate 151 wider than a normal particle track, the coincident disabling gate pulse generated in maximum time discriminator and gate 348 as applied through lead 353 to output trigger circuit 356 renders same inoperative resulting in no current flow in lead 281.

As has been previously stated, the pulse current flowing in lead 281 is applied through relay control circuit 263 to the first and second amplifier counting integrators 361, 362 respectively which in turn apply the integrated pulse signal produced during each transverse strip of photographic plate 151 scanned to terminals 301, 302 for connection to the recorder 303. More specifically, lead 281 is coupled to normally closed contact 277 of integrator reset relay 266 (see Figure 11). In the normally closed position, the contact 277 is coupled through contactor 276 of relay 266 to contactor 282 of the integrator change-over relay 267. In the normally closed position of the latter relay 267, contactor 282 contacts normally closed contact 283 which is in turn connected through lead 287 to the second amplifier counting integrator 362. Hence, with relays 266, 267 de-energized, the pulsed current in lead 281 is applied to the input of the second counting integrator 362. In addition, with the change-over relay 267 de-energized, the second contactor 291 thereof contacts second normally closed contact 292 and couples output lead 298 from the first counting integrator 361 to recorder terminals 301, 302. The foregoing de-energized conditions of relays 266, 267 occur in the manner previously described when transverse motor 57 is driving photographic plate 151 transversely beneath photomultiplier tube 312, i.e., during a single transverse scanning strip 153 of plate 151. As the transverse strip is scanned the corresponding pulsed current in lead 281 indicative of the particle tracks 152 within the scanned strip is thus continuously applied through lead 287 to capacitor 464 of the second counting integrator 362 (see Figure 12). The juncture of such capacitor with lead 287 is connected to the control grid of a pentode 466. The opposite side of capacitor 464 is connected to output lead 299 and to the cathode of a triode 467 which is coupled to pentode 466 in conventional fashion as an integrator with resistive regeneration and cathode follower output. The output in lead 299 is accordingly a running summation of all current pulses in lead 281 as the particular transverse strip of plate 151 is scanned.

At the end of the single transverse strip of the photographic plate, the relay chassis 211 functions in the manner previously described to reverse rotation of the transverse motor 57 for braking and stopping, and commence rotation of longitudinal motor 51. In addition it will be recalled that the relay chassis 211 simultaneously effects removal of ground from one of the integrator reset condensers 271, 272 whereby same is charged to high voltage through lead 273, and effects energization of integrator change-over relay 267. Contactors 282, 291 then contact normally open contacts 284, 293 respectively thus coupling lead 281 to input lead 288 of the first counting integrator 361 and coupling output lead 299 from the second counting integrator 362 to recorder terminals 301, 302. The integrated signal in lead 299 indicative of the total number of tracks in the transverse strip of photographic plate 151 just scanned is accordingly applied via terminals 301, 302 to recorder 303 and holds the recorder at the integrated level until the second counting integrator output lead 299 is disconnected by further action of change-over relay 267 at the end of the next successive transverse strip.

The relay chassis 211 then functions further to stop rotation of longitudinal motor 51 after effecting translation of photographic plate 151 to the longitudinal position of the next adjacent transverse strip 153 and commences reversed rotation of transverse motor 57 to move plate 151 along the strip in the reverse transverse direction relative to the strip just scanned. Reconnection of the corresponding one of condensers 271, 272 to ground is simultaneously effected by relay chassis 211 whereby the condenser discharges through the coil of reset relay 266 to momentarily connect contactor 276 to normally open contact 278. The foregoing action momentarily short circuits leads 288 and 298 of the first counting integrator 361 (note the connections to terminals 7, 8, 9 of plug 227 illustrated in Figure 10). The first counting integrator 361 is identical to the second counting integrator 362 previously described and accordingly comprises a capacitor 464' connected between leads 288, 298 and a pentode 466' and triode 467' connected as an integrator with resistive regeneration and cathode follower output. The momentary shorting of leads 288, 298 by reset relay 266 accordingly shorts capacitor 464' to remove any charge accumulated thereon and thus reset the first integrator 361 to zero at the start of the transverse strip of plate 151 now to be scanned. The change-over relay 267 is retained in the energized position during scanning of the present strip in the reversed transverse direction and accordingly the total number of tracks in such strip as indicated by the pulsed current in lead 281 is accumulated in first counting integrator 361. At the end of the strip, relay chassis 211 functions in a manner similar to that hereinbefore described in relation to the preceding strip, to de-energize change-over relay 267 simultaneously with preparation of longitudinal and transverse motors 51, 57 for scanning the next adjacent strip of the photographic plate 151. Lead 298 from first counting integrator 361 is accordingly coupled to recorder terminals 301, 302 and the connection from lead 281 to lead 288 is simultaneously switched to lead 287 of second counting integrator 362. In addition, reset relay 266 is primed for actuation in the manner previously described. The integrated signal in first counting integrator 361 is hence applied to recorder 303 and holds same at the integrated level during scanning of the next transverse strip 153 of photographic plate 151. As the transverse motor 57 translates the plate 151 to begin such next strip 153, reset relay 266 is momentarily energized to thereby short circuit capacitor 464 of the second counting integrator 362 and reset same to zero just prior to acceptance of pulses from lead 281. The cycle hereinbefore described is thereafter repeated a number of times until the entire plate 151 is scanned. It is thus to be appreciated that one counting integrator receives the output current pulses from output trigger circuit 356 and totals same during the course of one transverse scanning strip, while the preceding strip total pulse output of the other counting integrator is applied to recorder 303 and holds same at such total pulses output level.

In view of the foregoing, a normal nuclear particle track 152 (one which is parallel to the edge of the photographic plate 151) is illumined five times during the time the plate is viewed through the ocular slit by the photomultiplier tube 312 because of the speed of transverse motion and the rate of light modulation. The output of the photomultiplier tube 312 is then five cycles of an alternating voltage which is amplified and the frequency is doubled to ten pulses. Since the track 152 is parallel to the edge of the photographic plate 151, the phase reference voltage as developed from the photocell 316 is in phase with the train of ten pulses and the amplitude is above the minimum, but below the maximum, of the two amplitude discriminators 331, 334. Thus the train of ten pulses is passed to the cycle counting integrator 342 where a voltage proportional to the train of ten pulses is developed. Since the train of pulses is uninterrupted the minimum time discriminator 346 passes a voltage to operate the output trigger circuit 356. One of the two amplifier counting integrators 361, 362 then develops a voltage which is proportional to the one nuclear particle track 152. Succeeding normal nuclear particle tracks 152, which are scanned along the same "strip" of the photographic plate, increase the proportional voltage of the connected integrator 361, 362. At the end of the referenced "strip" the developed proportional voltage of the connected integrator 361, 362 is applied to the speedomax recorder 218. After the transverse movement of the photographic plate 151 to complete the scanning of the "strip," the plate is moved longitudinally to a succeeding "strip," and the plate is then moved transversely in the opposite direction. Such cycle of movement is repeated until the entire plate 151 has been scanned and the nuclear particle tracks for each "strip" counted and recorded to provide an energy distribution curve on the speedomax recorder 218, as illustrated in Fig. 9.

Dust particles on the photographic plate 151 and random grain clumpings in the emulsion of the plate are substantially symmetrical in configuration and so provide a constant light to the photomultiplier tube 312 which light is converted into a substantially constant signal. The tuned amplifier 321 has a narrow band width at the frequency of the signal developed by a normal nuclear particle track and so does not pass the constant signals from dust or grain clumpings. Those nuclear particle tracks 152 which are not parallel to the edge of the plate 151 result in signals which are out of phase with the phase-reference voltage developed from the photocell 316 and are blocked either at the frequency doubler and phase gate 323 or at the minimum amplitude discriminator. Scratches on the plate 151 which are parallel to the edge and other spurious marks on the plate resulting in signals of greater than normal amplitude are blocked by the maximum amplitude discriminator 334 and maximum amplitude gate 338. Also, such defects of the plate 151 which result in a greater than normal train of pulses are eliminated from the count by the maximum time discriminator and gate 348. Thus, those marks on the plate 151, which would be eliminated during visual counting by a human operator, are eliminated by the present invention.

While the salient features of the present invention have been described in detail with respect to a single embodiment it will, of course, be apparent that numerous modifications may be made within the spirit and scope of the invention and it is therefore not desired to limit the invention to the exact details shown except insofar as they may be defined in the following claims.

What is claimed is:

1. In an automatic counting device, the combination comprising a photographic plate having elongated nuclear particle tracks, a photomultiplier tube disposed in a fixed position over said plate to view a limited area, a source of modulated dark-field illumination disposed under said plate to project such illumination through said plate toward said tube, reversible transverse movement means coupled to said plate, longitudinal movement means also coupled to said plate, an automatic relay and switch control circuit connected to each of said movement means to provide a scanning movement of said plate with respect to said tube, a photocell disposed adjacent said source of illumination to receive direct light therefrom and develop a phase reference signal, an electronic counting circuit connected to said photomultiplier tube and said photocell to count only those of said tracks occurring parallel to the longitudinal sides of said plate, and a recorder coupled to said counting circuit to provide a distribution curve of said tracks as counted.

2. In an automatic counting device of elongated nuclear particle tracks recorded on a photographic plate, the combination comprising a microscope having an objective lens and a substage condenser, mounting means for said plate supporting the same between said objective lens and said substage condenser, means coupled to said mounting means to provide automatic scanning of successive strips of said plate with alternate transverse and longitudinal movements thereof, a source of modulated dark-field illumination disposed to project such illumination through said substage condenser and plate whereby flashes of light scattered from said nuclear particle tracks on said plate enter said objective lens, a photomultiplier tube disposed in an ocular position of said microscope to convert light flashes passed by a limited portion of said objective lens into electrical signals, an electronic counting circuit connected to said tube to provide a voltage proportional to the number of said tracks in each of said strips, and a recorder connected to said electronic circuit for plotting said voltage.

3. In an automatic counting device of elongated nuclear particle tracks recorded on a photographic plate, the combination comprising a microscope having an objective lens and a substage condenser, mounting means for said plate supporting the same between said objective lens and said substage condenser, reversible transverse movement means coupled to said mounting means, longitudinal movement means also coupled to said mounting means, an automatic relay and switch control circuit connected to each of said movement means to provide alternate actuation of said transverse and longitudinal movement means for the scanning of successive strips of said plate by said objective lens, a source of modulated dark-field illumination disposed to project such illumination through said substage condenser and plate whereby flashes of light scattered from said nuclear particle tracks on said plate enter said objective lens, a photomultiplier tube disposed in an ocular position of said microscope to convert light flashes passed by a limited portion of said objective lens into electrical signals, an electronic counting circuit connected to said tube to provide a voltage proportional to the number of said tracks in each of said strips, and a recorder connected to said electronic circuit for plotting said voltage.

4. In an automatic counting device of elongated nuclear particle tracks recorded on a photographic plate, the combination comprising a microscope having an objective lens and a substage condenser, mounting means for said plate supporting the same between said objective lens and said substage condenser, drive means coupled to said mounting means to provide transverse and longitudinal movement of said plate with respect to said objective lens, an automatic relay and switch control circuit connected to said drive means to provide alternate transverse and longitudinal means for the scanning of successive strips of said plate by said objective lens, a source of modulated dark-field illumination disposed to project such illumination through said substage condenser and plate toward said objective lens, a photomultiplier tube disposed in an ocular position of said microscope to convert light passed by a limited portion of said objective lens into electrical signals, a photocell disposed adjacent to said substage condenser to receive light directly, an electronic counting circuit connected to said photomultiplier tube and said photocell to provide a voltage proportional to the number of said tracks in each of said strips disposed parallel to a longitudinal edge of said plate, and a recorder connected to said electronic circuit for plotting said voltage of each of said strips to provide a distribution curve of tracks over said plate.

5. The combination of claim 4 wherein said source of modulated dark-field illumination comprises a source of a beam of light, a polarizer disk passing light rays of a single plane disposed transverse to said beam of light, means coupled to said polarizer disk for rotation thereof, an analyzer disk divided into quadrants with one opposing pair passing light in a plane perpendicular to that of the other opposing pair, said analyzer disk disposed parallel to and in alignment with said polarizer disk, and a dark-field stop disposed parallel to said analyzer disk to intercept and stop the central light rays passed by said analyzer disk.

6. The combination of claim 4 wherein said electronic counting circuit comprises, a frequency doubler and phase gate coupled to said photomultiplier tube and to said photocell to provide an output voltage dependent upon the phase of signals from said tube and photocell, amplitude discriminators connected to said frequency doubler and phase gate responsive to pass signals having an amplitude between two limits, an integrator coupled to said amplitude discriminators to develop a voltage proportional to an uninterrupted train of signals, time discriminators coupled to said integrator to develop an output voltage in response to an input voltage between two time limits, a pair of counting integrators alternately coupled to said time discriminators during the scanning of successive strips whereby one counting integrator receives signals during an entire strip scanning, and switching means connected between said counting integrators and said recorder.

7. In an automatic counting device, the combination comprising a photographic plate having nuclear particle tracks, a photomultiplier tube disposed over said plate to view a limited area, a source of a beam of light disposed in alignment with said photomultiplier tube, a polarizer disk passing light rays of a single plane disposed transverse to said beam of light, means coupled to said polarizer disk for rotation thereof, an analyzer disk divided into quadrants with one opposing pair passing light in a plane perpendicular to that of the other opposing pair, said analyzer disk disposed parallel to and in alignment with said polarizer disk, a dark field stop disposed parallel to said analyzer disk to intercept and stop the central light rays passed by said analyzer disk, reversible transverse movement means coupled to said plate, longitudinal movement means also coupled to said plate, a relay control circuit connected to each of said movement means to provide automatic scanning movement of said plate with respect to said tube, a counting circuit connected to said tube, and a recorder coupled to said counting circuit to provide a distribution curve of said tracks on said plate.

References Cited in the file of this patent
UNITED STATES PATENTS

| | | |
|---|---|---|
| 2,244,362 | Hartig | June 3, 1941 |
| 2,450,761 | MacNeille | Oct. 5, 1948 |
| 2,480,312 | Wolf | Aug. 30, 1949 |
| 2,584,052 | Sandorff et al. | Jan. 29, 1952 |
| 2,661,902 | Wolff et al. | Dec. 8, 1953 |